US 7,615,506 B2

(12) United States Patent
Aitken et al.

(10) Patent No.: US 7,615,506 B2
(45) Date of Patent: Nov. 10, 2009

(54) DURABLE TUNGSTEN-DOPED TIN-FLUOROPHOSPHATE GLASSES

(75) Inventors: Bruce Gardiner Aitken, Corning, NY (US); Shari Elizabeth Koval, Beaver Dams, NY (US); Mark Alejandro Quesada, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 635 days.

(21) Appl. No.: 11/544,262

(22) Filed: Oct. 6, 2006

(65) Prior Publication Data

US 2008/0146431 A1   Jun. 19, 2008

(51) Int. Cl.
*C03C 3/247* (2006.01)
*C03C 8/08* (2006.01)
*C03C 8/20* (2006.01)
*B32B 15/00* (2006.01)
*B32B 17/00* (2006.01)
*H01L 23/29* (2006.01)

(52) U.S. Cl. ............... 501/44; 501/15; 501/21; 501/24; 428/426; 428/432; 257/794; 257/E23.118

(58) Field of Classification Search .......... 501/15, 501/21, 24, 44; 428/426, 432; 257/794, 257/E23.118

See application file for complete search history.

(56) References Cited

U.S. PATENT DOCUMENTS

| 4,314,031 | A |   | 2/1982 | Sanford et al. ............ 501/44 |
| 5,089,446 | A |   | 2/1992 | Cornelius et al. .......... 501/15 |
| 5,179,046 | A | * | 1/1993 | Francis et al. ............. 501/15 |
| 5,246,890 | A | * | 9/1993 | Aitken et al. .............. 501/15 |
| 5,281,560 | A | * | 1/1994 | Francis et al. ............. 501/15 |
| 6,355,586 | B1 | * | 3/2002 | Usui et al. ................. 501/45 |
| 6,617,269 | B2 | * | 9/2003 | Yamanaka ................. 501/24 |
| 2009/0011915 | A1 | * | 1/2009 | Drake et al. ............... 501/15 |

FOREIGN PATENT DOCUMENTS

| JP | 2001-010843 | 1/2001 |
| JP | 2004-018335 | 1/2004 |

OTHER PUBLICATIONS

U.S. Appl. No. 11/207,691, filed Aug. 18, 2005 to Aitken et al.

* cited by examiner

*Primary Examiner*—Karl E Group
*Assistant Examiner*—Elizabeth A Bolden
(74) *Attorney, Agent, or Firm*—William J. Tucker, Esq.; Christopher Nicastri; Kevin M. Able (57) ABSTRACT

Tungsten-doped tin-fluorophosphate glasses are described herein which exhibit excellent humidity resistance, thermal resistance, and have a low glass transition temperature which makes them suitable for low temperature sealing applications, such as for encapsulating electronic components. In one embodiment, these glasses comprise 55-75% Sn, 4-14% P, 6-24% O, 4-22% F, and 0.15-15% W on a weight percent elemental basis.

20 Claims, 5 Drawing Sheets

FIG. 7C ental basis.

DURABLE TUNGSTEN-DOPED TIN-FLUOROPHOSPHATE GLASSES

CROSS-REFERENCE TO RELATED PATENT APPLICATION

This application is related to U.S. patent application Ser. No. 11/207,691 filed on Aug. 18, 2005 in the name of Bruce G. Aitken et al. and entitled "Method for Inhibiting Oxygen and Moisture Degradation of a Device and the Resulting Device" which is incorporated by reference herein.

BACKGROUND OF THE INVENTION

1. Field of the Invention

The present invention relates to glass compositions, and in particular to W-doped Sn-fluorophosphate glass compositions which can be used to make a fusion-type seal, such as one used to hermetically seal OLEDs (organic light emitting diodes) or other devices where it is important to inhibit/prevent oxygen and moisture penetration.

2. Description of Related Art

In a fusion, or vitreous, type seal, the sealing material must be fused, softened or melted such that it flows and wets the surface to which it is applied. A fusion sealing material may be applied to a single sealing surface, as in glazing or enameling. Alternatively, the sealing material may be employed to join two opposed surfaces. The result is then referred to as an intermediate seal or joint.

The sealing material used to make a fusion-type seal must be heated to a temperature where it becomes soft enough to wet the sealing surface and form a hermetic bond. For many purposes, it is desirable to maintain the sealing temperature as low as possible. This is particularly true when the sealing material is used to seal electrical and electronic articles which commonly employ thermally sensitive parts. Accordingly, considerable attention has been given to glasses which have a low transition temperature ($T_g$) because this property makes them suitable to be used as sealing material. The transition temperature ($T_g$) of a glass is the temperature at which the glass is deemed to be transformed from the solid to the liquid state.

U.S. Pat. No. 4,314,031 (Sandford et al.), the contents of which are hereby incorporated herein, discloses low temperature sealing glasses which are known as tin-phosphorus-oxyfluoride glasses. These glasses comprise, in weight percent on an elemental basis, 20-85% Sn, 2-20% P, 3-20% O, 10-36% F and at least 75% total of Sn+P+O+F. In addition, these glasses may contain up to 25% Pb, up to 12% Zr, up to 10% Fe, up to 3% Ti, up to 1% Ca, up to 3% Ba, up to 2% Zn, up to 12% total of Fe+Ti+Ca+Ba+Zn, up to 3% total of Na+K+Li, up to 4% Al, up to 1% Si, and 0-20% total of anion modifiers selected from the group consisting of Cl, Br and I. These glasses have relatively low transition temperatures ($T_g$) which are frequently in the vicinity of 100° C.

U.S. Pat. No. 5,089,446 (Cornelius et al.), the contents of which are hereby incorporated herein, discloses the addition of Nb in an amount of up to 11% into the tin-phosphorus-oxyfluoride glasses to provide sealing glasses that are capable of forming a fusion seal at a temperature of 350° C. or lower. Although, the glasses disclosed in the '031 patent and the '446 patent work well in many sealing applications there is still a desire to improve upon these special types of low temperature sealing glasses. This is done in the present invention.

BRIEF DESCRIPTION OF THE INVENTION

The present invention provides tungsten-doped tin-fluorophosphate glasses which exhibit excellent humidity resistance, thermal resistance, and have a low glass transition temperature ($T_g$) which makes them suitable for low temperature sealing applications. In one application, the tungsten-doped tin-fluorophosphate glass can be used to encapsulate a device (e.g., OLEDs). In another application, the tungsten-doped tin-fluorophosphate glass can be used as a frit to seal two plates (e.g., two glass plates). In yet another application, the tungsten-doped tin-fluorophosphate glass can be used as a sealing glass which is heated in a manner such that a portion of it swells and forms a seal with another plate (e.g., glass plate). The preferred tungsten-doped tin-fluorophosphate glasses comprise about 55-75% Sn, 4-14% P, 6-24% O, 4-22% F, and 0.15-15% W on a weight percent elem

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

It has been discovered that the addition of tungsten to Sn-fluorophosphate batch compositions yields stable, homogeneous glasses, some of which have sufficient chemical durability where bulk samples remain unchanged after 1000 hours of exposure to moist air at atmospheric pressure, 85° C., and 85% relative humidity. Along with outstanding chemical durability, these glasses also have a low glass transition temperature ($T_g$) which is in the vicinity of 100° C., typically from about 50° C. to about 160° C., that is comparable to undoped Sn-fluorophosphate glasses. Plus, the addition of tungsten in Sn-fluorophosphate glasses expands the glass forming region of the basic $SnO$—$SnF_2$—$P_2O_5$ system so as to encompass compositions that have a higher O/F ratio which also helps to improve the chemical durability. An additional benefit of having a glass with a higher O/F ratio is associated with its resulting color and this benefit is discussed in detail below with respect to the W-doped Sn-fluorophosphate glasses identified in TABLES 1A-1B.

The glasses of this invention generally comprise, in weight percent on an elemental basis, as calculated from a batch composition used to prepare the glass, 55-75% Sn, 4-14% P, 6-24% O, 4-22% F, and 0.15-15% W. These compositional limits are nominal, i.e. these are the compositions of the batch prior to melting and depending on the melt temperature and time, and perhaps also on humidity, the final glass compositions are likely to be different. For instance, some fraction of F is invariably lost, although this loss can be minimized by melting at a lower temperature and/or for a shorter time.

These new glasses can have a preferred composition which comprises, in weight percent on an elemental basis, as calculated from a batch composition used to prepare the glass, 58-68% Sn, 5-11% P, 11-21% O, 6-13% F, and 1-10% W. And, these new glasses can have a more preferred composition that exhibits outstanding chemical durability which comprises, in weight percent on an elemental basis, as calculated from a batch composition used to prepare the glass, 59-68% Sn, 6-11% P, 13-20% O, 6-11% F, and 1-6% W.

The inventors have manufactured and tested several exemplary W-doped Sn-fluorophosphate glasses. These sample W-doped Sn-fluorophosphate glasses were manufactured by melting 25 grams of a batch mixture with the appropriate amounts of $SnO$, $SnF_2$, $NH_4H_2PO_4$ (ammonium phosphate) and $H_2WO_4$ (tungstic acid) within vitreous C crucibles for a period of 15-30 minutes at 350-425° C. Then, the melts were quenched by pouring them into brass molds so as to form glass discs which had an approximate thickness of 3 mm. If desired, other Sn, O, F, P and W sources such as, but not limited to $Sn_2P_2O_7$, $SnC_2O_4$ (tin oxalate), $(NH_4)_2HPO_4$, or $WO_3$ could have been used. It was found that tungstic acid ($H_2WO_4$) is a surprisingly superior W source when compared to tungsten trioxide ($WO_3$). In particular, glasses made with $H_2WO_4$ as the W source were typically homogeneous and inclusion-free when they where prepared using the above melting conditions. Whereas, glasses of the same nominal composition but made with $WO_3$ as the W source were typically inclusion-bearing when they where prepared using the above melting conditions.

The following TABLE 1A identifies the nominal compositions in mole % of the sample W-doped Sn-fluorophosphate glasses. And, TABLE 1B identifies the resulting weight percent on an elemental basis as calculated from the batch composition which was used to prepare the sample W-doped Sn-fluorophosphate glasses. In addition, TABLE 1B identifies the following: (1) the O/F ratio (as calculated from the batch composition); (2) the resulting appearance or color of each sample of W-doped Sn-fluorophosphate glass; (3) the glass transition temperature ($T_g$) (measured by differential scanning calorimetry) and (4) the weight change ($\Delta wt$) after exposure to moist air at 85° C. and 85% relative humidity for 1000 hours of selected ones of the sample W-doped Sn-fluorophosphate glasses (where $\Delta wt$ represents the resultant weight gain/loss expressed as a percentage of the initial weight).

TABLE 1A (mole percent)*

| Sample Glass | #1 | #2 | #3 | #4 | #5 | #6 | #7 | #8 | #9 |
|---|---|---|---|---|---|---|---|---|---|
| SnO | — | 7.5 | 17.5 | 27.5 | 32.5 | 37.5 | 35 | 37.5 | 40 |
| $SnF_2$ | 82.5 | 75 | 65 | 55 | 50 | 45 | 45 | 40 | 37.5 |
| $WO_3$ | 2.5 | 2.5 | 2.5 | 2.5 | 2.5 | 2.5 | 5 | 2.5 | 2.5 |
| $P_2O_5$ | 15 | 15 | 15 | 15 | 15 | 15 | 15 | 20 | 20 |

| Sample Glass | #10 | #11 | #12 | #13 | #14 | #15 | #16 | #17 | #18 |
|---|---|---|---|---|---|---|---|---|---|
| SnO | 27.5 | 32.5 | 37.5 | 40 | 40 | 39.5 | 40 | 42.5 | 42.5 |
| $SnF_2$ | 45 | 40 | 35 | 40 | 37.5 | 39.5 | 42.5 | 40 | 35 |
| $WO_3$ | 2.5 | 2.5 | 2.5 | 2.5 | 5 | 3.75 | 2.5 | 2.5 | 2.5 |
| $P_2O_5$ | 25 | 25 | 25 | 17.5 | 17.5 | 17.25 | 15 | 15 | 20 |

| Sample Glass | #19 | #20 | #21 | #22 | #23 | #24 | #25 | #26 | #27 |
|---|---|---|---|---|---|---|---|---|---|
| SnO | 45 | 32.5 | 30 | 37.5 | 40 | 40 | 42.5 | 45 | 35 |
| $SnF_2$ | 32.5 | 45 | 45 | 37.5 | 35 | 32.5 | 30 | 27.5 | 50 |
| $WO_3$ | 2.5 | 7.5 | 10 | 2.5 | 2.5 | 2.5 | 2.5 | 2.5 | 2.5 |
| $P_2O_5$ | 20 | 15 | 15 | 22.5 | 22.5 | 25 | 25 | 25 | 12.5 |

| Sample Glass | #28 | #29 | #30 | #31 | #32 | #33 | #34 | #35 | #36 |
|---|---|---|---|---|---|---|---|---|---|
| SnO | 37.5 | 32.5 | 30 | — | 10 | 20 | 5 | 15 | 42.5 |
| $SnF_2$ | 47.5 | 52.5 | 55 | 85 | 75 | 65 | 80 | 70 | 32.5 |
| $WO_3$ | 2.5 | 2.5 | 2.5 | 2.5 | 2.5 | 2.5 | 2.5 | 2.5 | 2.5 |
| $P_2O_5$ | 12.5 | 12.5 | 12.5 | 12.5 | 12.5 | 12.5 | 12.5 | 12.5 | 22.5 |

| Sample Glass | #37 | #38 | #39 | #40 |
|---|---|---|---|---|
| SnO | 45 | 47.5 | 47.5 | 47.5 |
| $SnF_2$ | 30 | 30 | 27.5 | 25 |
| $WO_3$ | 2.5 | 2.5 | 2.5 | 2.5 |
| $P_2O_5$ | 22.5 | 20 | 22.5 | 25 |

TABLE 1B (weight percent)*

| Sample Glass | #1 | #2 | #3 | #4 | #5 | #6 | #7 | #8 | #9 |
|---|---|---|---|---|---|---|---|---|---|
| Sn | 62.7 | 63.3 | 64.2 | 65.1 | 65.7 | 66.1 | 63.1 | 62.5 | 62.7 |
| P | 5.94 | 6.02 | 6.11 | 6.20 | 6.24 | 6.28 | 6.15 | 8.42 | 8.42 |
| W | 2.94 | 2.97 | 3.01 | 3.05 | 3.08 | 3.12 | 6.09 | 3.10 | 3.14 |
| F | 20.0 | 18.4 | 16.2 | 13.9 | 12.7 | 11.5 | 11.4 | 10.3 | 9.7 |
| O | 8.44 | 9.32 | 10.5 | 11.7 | 12.4 | 13.0 | 13.3 | 15.8 | 16.1 |
| O/F | .42 | .51 | .65 | .84 | .98 | 1.13 | 1.17 | 1.53 | 1.66 |
| Color | vdb | Db | db | gb | bg | ol | vdb | vgb | Gb |
| $T_g$ (° C.) | 49 | 58 | 66 | 73 | 74 | 97 | 101 | 109 | 114 |
| $\Delta wt$ (%) | | | | | 1.3 | 1.0 | .90 | .12 | .16 |

| Sample Glass | #10 | #11 | #12 | #13 | #14 | #15 | #16 | #17 | #18 |
|---|---|---|---|---|---|---|---|---|---|
| Sn | 57.8 | 58.2 | 58.7 | 64.5 | 61.7 | 63.3 | 66.4 | 66.6 | 62.9 |
| P | 10.4 | 10.5 | 10.6 | 7.38 | 7.29 | 7.20 | 6.28 | 6.33 | 8.47 |
| W | 3.08 | 3.12 | 3.12 | 3.12 | 6.17 | 4.65 | 3.12 | 3.12 | 3.14 |
| F | 11.5 | 10.3 | 9.07 | 10.3 | 9.56 | 10.1 | 10.9 | 10.3 | 9.09 |
| O | 17.2 | 17.9 | 18.5 | 14.7 | 15.3 | 14.8 | 13.3 | 13.6 | 16.4 |

TABLE 1B-continued (weight percent)*

| O/F | 1.5 | 1.74 | 2.04 | 1.43 | 1.60 | 1.47 | 1.22 | 1.32 | 1.80 |
|---|---|---|---|---|---|---|---|---|---|
| Color | vdb | vdb | vdb | ol | vdb | bg | ol | br | Bg |
| $T_g$ (°C.) | 112 | 120 | 128 | 107 | | | 101 | 104 | 121 |
| Δwt (%) | | 2.7 | 4.0 | .01 | | .04 | .02 | .02 | .05 |

Sample Glass

| | #19 | #20 | #21 | #22 | #23 | #24 | #25 | #26 | #27 |
|---|---|---|---|---|---|---|---|---|---|
| Sn | 63.2 | 60.1 | 57.2 | 60.5 | 60.8 | 58.9 | 59.1 | 59.4 | 67.7 |
| P | 8.51 | 6.07 | 5.98 | 9.47 | 9.51 | 10.6 | 10.6 | 10.7 | 5.19 |
| W | 3.14 | 9.03 | 11.8 | 3.12 | 3.14 | 3.15 | 3.16 | 3.17 | 3.08 |
| F | 8.48 | 11.2 | 11.0 | 9.69 | 9.08 | 8.45 | 7.83 | 7.21 | 12.7 |
| O | 16.8 | 13.6 | 13.9 | 17.1 | 17.5 | 18.9 | 19.2 | 19.6 | 11.3 |
| O/F | 1.98 | 1.21 | 1.26 | 1.76 | 1.93 | 2.24 | 2.45 | 2.72 | .89 |
| Color | Bg | | | | | | | | |
| $T_g$ (°C.) | 124 | 101 | 103 | 113 | 123 | 134 | 139 | 145 | 74 |
| Δwt (%) | .01 | 1.27 | 1.54 | 0.14 | 0.05 | 0.47 | 0.33 | 0.22 | 0.26 |

Sample Glass

| | #28 | #29 | #30 | #31 | #32 | #33 | #34 | #35 | #36 |
|---|---|---|---|---|---|---|---|---|---|
| Sn | 67.9 | 67.4 | 67.2 | 64.3 | 65.3 | 66.3 | 64.9 | 65.7 | 61.0 |
| P | 5.24 | 5.19 | 5.15 | 4.93 | 4.98 | 5.06 | 4.98 | 5.06 | 9.56 |
| W | 3.10 | 3.08 | 3.06 | 2.93 | 2.97 | 3.02 | 2.96 | 3.00 | 3.15 |
| F | 12.2 | 13.3 | 13.9 | 20.6 | 18.4 | 16.2 | 19.5 | 17.3 | 8.46 |
| O | 11.6 | 11.0 | 10.7 | 7.13 | 8.23 | 9.43 | 7.71 | 8.88 | 17.8 |
| O/F | .95 | .83 | .77 | .35 | .45 | .58 | .40 | .51 | 2.10 |
| Color | | | | | | | | | |
| $T_g$ (°C.) | 75 | 75 | 76 | 59 | 65 | 71 | 62 | 68 | 127 |
| Δwt (%) | 0.51 | | | | | | | | 0.00 |

Sample Glass

| | #37 | #38 | #39 | #40 |
|---|---|---|---|---|
| Sn | 61.2 | 63.4 | 61.5 | 59.6 |
| P | 9.60 | 8.55 | 9.64 | 10.7 |
| W | 3.16 | 3.16 | 3.17 | 3.18 |
| F | 7.84 | 7.85 | 7.22 | 6.58 |
| O | 18.2 | 17.1 | 18.5 | 20.0 |
| O/F | 2.32 | 2.18 | 2.56 | 3.04 |
| Color | | | | |
| $T_g$ (°C.) | 134 | 131 | 133 | 150 |
| Δwt(%) | −0.03 | −0.08 | 0.01 | −0.07 |

Note:
these sample glasses could also contain optional constituent(s) such as for example 0-25% Pb.
Color abbreviations:
db = dark blue,
gb = greenish blue,
bg = blue green,
ol = olive,
br = brown, and
v = very.

Figure 1:
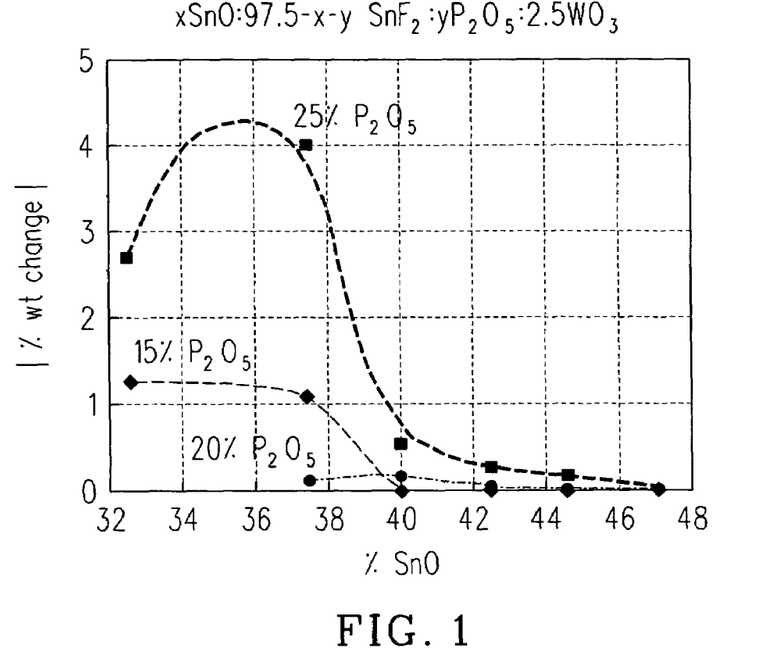
FIG. 1 is a graph showing the absolute value of the percent weight change of selected samples of W-doped Sn-fluorophosphate glasses in accordance with the present invention.

Referring to FIG. 1, there is a graph that shows the absolute value of the percent weight change of selected samples of the W-doped Sn-fluorophosphate glass after the sampled glasses were exposed to moist air at atmospheric pressure, 85° C. and 85% relatively humidity for 1000 hours (see glass samples 5-6, 8-9, 10-12, 16-19, 24-26 and 40 in TABLE 1A). The sampled W-doped Sn-fluorophosphate glass typically exhibited weight gains of less than 5%, often less than 1 or 2%, and in many cases less than 0.1 or 0.2% after exposure to air at atmospheric pressure, 85° C. and 85% relative humidity for 1000 hours. Furthermore, the W-doped Sn-fluorophosphate glasses which had the highest moisture resistance also had the highest SnO content and hence the highest O/F ratio (see glass samples 5-6, 8-9, 16-19 and 24-26 in TABLE 1A). After reviewing this graph and TABLE 1A, it can be seen that at any given $P_2O_5$ concentration, the most durable glasses are the ones with the highest SnO content. Plus, the physical appearances (e.g., surface gloss) of most SnO-rich glasses remained unchanged during the 1000 hour exposure to moist air at atmospheric pressure, 85° C. and 85% relative humidity.

Figure 2:
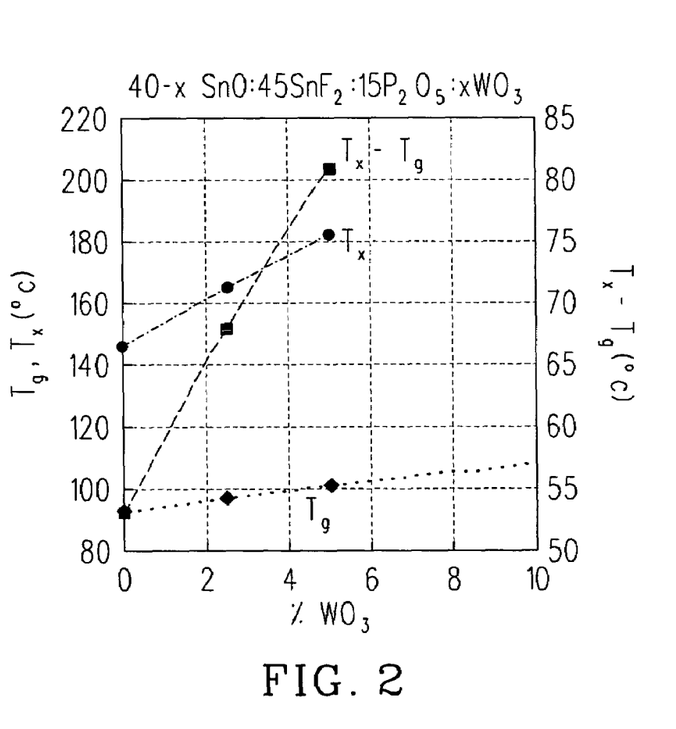
FIG. 2 is a graph showing a glass transition temperature ($T_g$), a crystallization temperature ($T_x$), and a thermal stability temperature ($T_x-T_g$) for selected samples of W-doped Sn-fluorophosphate glasses in accordance with the present invention.

Referring to FIG. 2, there is a graph showing a glass transition temperature ($T_g$), a crystallization temperature ($T_x$), and a thermal stability temperature ($T_x-T_g$) for selected W-doped Sn-fluorophosphate glasses which were prepared from a batch composition comprising, in mol %, (40−x) SnO, 45 $SnF_2$, 15 $P_2O_5$, and x $WO_3$. The graph shows that the $T_x$ of these W-doped Sn-fluorophosphate glasses increased more rapidly than the $T_g$ with an increasing $WO_3$ concentration. As a result, the thermal stability of these W-doped Sn-Fluorophosphate glasses, as measured by $T_x-T_g$, the difference between the crystallization and glass transition temperatures, also increased with the increasing $WO_3$ concentration. This is of particular importance when W-doped Sn-fluorophosphate glasses are used in sealing applications where it is desirable that the glass flow before crystallizing.

In FIG. 2, the glass transition temperature ($T_g$) represents the point where the material, on heating, converts from an amorphous solid or glass into a supercooled liquid. It is widely assumed that this temperature corresponds to the point where the material has a viscosity of about $10^{13}$ poise and it is roughly the same as the so-called annealing point. $T_x$ is the temperature of the onset of crystallization as measured by differential scanning calorimetry (DSC) and represents the maximum temperature which the glass can be heated to without undergoing devitrification. The difference $T_x-T_g$ is a crude measure of "glass stability" or the temperature window within which the glass can be heated without crystallizing. The larger $T_x-T_g$, then the lower the viscosity (or the higher the fluidity) that can be attained when heating the glass. Thus, the glasses with very small $T_x-T_g$ cannot be heated to a sufficiently low viscosity and so are generally unsuitable for sealing purposes.

In reviewing the graphs in FIGS. 1 and 2, it can be seen that the W-doped Sn-fluorophosphate glasses of the present invention exhibit both outstanding moisture resistance and outstanding thermal stability, making them well suited for use in a wide variety of sealing/encapsulation applications. For instance, some of the sealing/encapsulation applications include: (1) using the W-doped Sn-fluorophosphate glass to encapsulate a device (e.g., OLEDs); (2) using the W-doped Sn-fluorophosphate glass as a frit to seal two plates (e.g., two glass plates); and (3) using the W-doped Sn-fluorophosphate glass as a sealing glass plate which is heated in a manner such that a portion of it swells and forms a seal with a substrate plate (e.g., glass plate). A detailed discussion about each of these exemplary sealing/encapsulation applications is provided next with respect to FIGS. 3-6.

Figure 3:
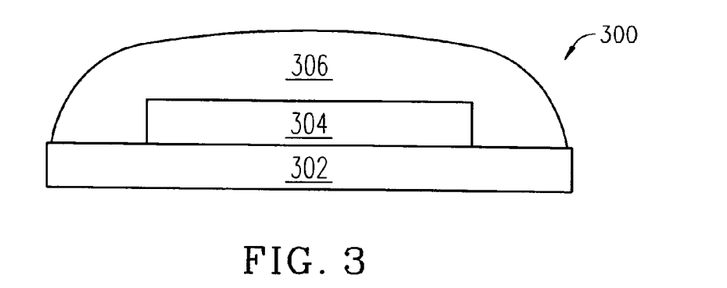
FIG. 3 is a cross-sectional side view of an encapsulated article which can be made by using the W-doped Sn-fluorophosphate glass of the present invention.

Referring to FIG. 3, there is a diagram illustrating a cross-sectional side view of an encapsulated article 300 which can be made by using the W-doped Sn-fluorophosphate glass of the present invention. As shown, the encapsulated article 300 includes a support (substrate) plate 302 (e.g., glass plate 302) which had a device 304 (e.g., OLEDs 304) deposited/placed thereon which was then encapsulated by W-doped Sn-fluorophosphate glass 306. Some examples of the different types of devices 304 that can be encapsulated by the W-doped Sn-fluorophosphate glass 306 includes an organic-electronic device (e.g., OLED, PLED, photovoltaic, a thin film transistor), a thin-film sensor, an optoelectronic device (e.g., optical switch, waveguide), a photovoltaic device, a thin-film sensor, an evanescent waveguide sensor, a food container and a medicine container (see the related U.S. patent application Ser. No. 11/207,691).

The encapsulated article 300 can be manufactured by depositing/placing the W-doped Sn-fluorophosphate glass 306 on top of the device 304 and support (substrate) plate 302 (e.g., glass plate 302). The W-doped Sn-fluorophosphate glass 306 can be deposited using anyone of a variety of processes including, for example, sputtering, flash evaporation, spraying, pouring, frit-deposition, vapor-deposition, dip-coating, painting, rolling (using a film W-doped Sn-fluorophosphate glass 306), spin-coating, a co-evaporation, a laser ablation process, or any combination thereof. Alternatively, multiple layers of the same or different types of W-doped Sn-fluorophosphate glass 306 can be deposited (e.g., sputtered) over the device 304 which is located on top of the support (substrate) plate 302.

The manufacturing process may also include an annealing, consolidating or heat treating step which is performed to remove defects (e.g., pores) within the W-doped Sn-fluorophosphate glass 306 that were formed during the deposition step. The relatively low glass transition temperature ($T_g$) of the W-doped Sn-fluorophosphate glass 306 means that it can be heat treated at a temperature low enough to avoid thermally damaging the OLEDs 304 (or other device(s) 304). If desired, the deposition step and the heat treatment step can be performed in a vacuum or inert atmosphere. This would be done to ensure that the water-less and oxygen-free condition is maintained throughout the sealing process. This is especially important when a robust, long-life operation of organic electronics (e.g., OLEDs 304) with minimal degradation is desired.

In one embodiment, the device 304 which is encapsulated by the W-doped Sn-fluorophosphate glass 306 can be an OLED device 304. However, it might be thought that the W addition to Sn-fluorophosphate glass would lead to a glass that is unsuitable for OLED encapsulation because of the strong light absorption which arises from the expected reduction of $W^{6+}$ to $W^{5+}$. In particular, when W is added to a regular glass composition it is well known that the W will be partly reduced to a lower oxidation state $W^{5+}$ which gives the host material a dark blue color. In fact, this color is typically so strong that the host material appears black (note: a black color may not be a problem for other types of encapsulation/sealing applications). But, the addition of W into Sn-fluorophosphate glass expands the glass forming region of the basic SnO—$SnF_2$—$P_2O_5$ system so as to encompass compositions that have a higher O/F ratio which affects the color of the resulting W-doped Sn-fluorophosphate glass 306. For example, the color of F-rich W-doped Sn-fluorophosphate glass 306 is typically a very dark blue. In contrast, the color of the O-rich W-doped Sn-fluorophosphate glass 306 is an unexpected pale olive which has light transmission characteristics that are well suited for light emitting applications like the ones that utilize OLEDs 304.

Figure 4A:
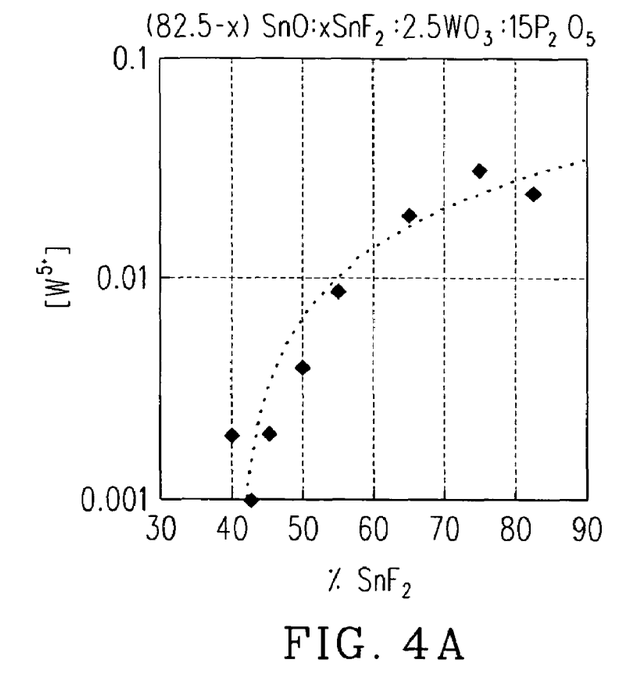
FIGS. 4A and 4B are graphs that illustrate the results of electron paramagnetic resonance (EPR) measurements which were performed on selected W-doped Sn-fluorophosphate glasses of the present invention.

It is clear from the tint of the O-rich W-doped Sn-fluorophosphate glass 306 that the $W^{5+}$ concentration must be significantly less than that of the F-rich W-doped Sn-fluorophosphate glass 306. This has been confirmed by performing electron paramagnetic resonance (EPR) measurements on selected samples of W-doped Sn-fluorophosphate glasses 306. FIG. 4A is a graph that illustrates the results of one set of EPR measurements which were made using selected samples of W-doped Sn-fluorophosphate glasses 306 which had a 15% $P_2O_5$ content. The molar compositions of these W-doped Sn-fluorophosphate glasses 306 are identified below in TABLE 2.

TABLE 2

| | Sample Glass | | | | | | | |
|---|---|---|---|---|---|---|---|---|
| | #1 | #2 | #3 | #4 | #5 | #6 | #16 | #17 |
| SnO | — | 7.5 | 17.5 | 27.5 | 32.5 | 37.5 | 40 | 42.5 |
| $SnF_2$ | 82.5 | 75 | 65 | 55 | 50 | 45 | 42.5 | 40 |
| $WO_3$ | 2.5 | 2.5 | 2.5 | 2.5 | 2.5 | 2.5 | 2.5 | 2.5 |
| $P_2O_5$ | 15 | 15 | 15 | 15 | 15 | 15 | 15 | 15 |
| % $W^{5+}$ | .025 | .031 | .019 | .009 | .004 | .002 | .001 | .002 |

Upon reviewing this graph and TABLE 2, the results indicate that, at a constant 15% $P_2O_5$ concentration and a constant W doping level, the proportion of reduced W, i.e. $W^{5+}$ (the rest being $W^{6+}$) increased with increasing F content and this correlated with the change in tint from a pale brown (most oxidized) to a very dark blue (most reduced).

Figure 4B:
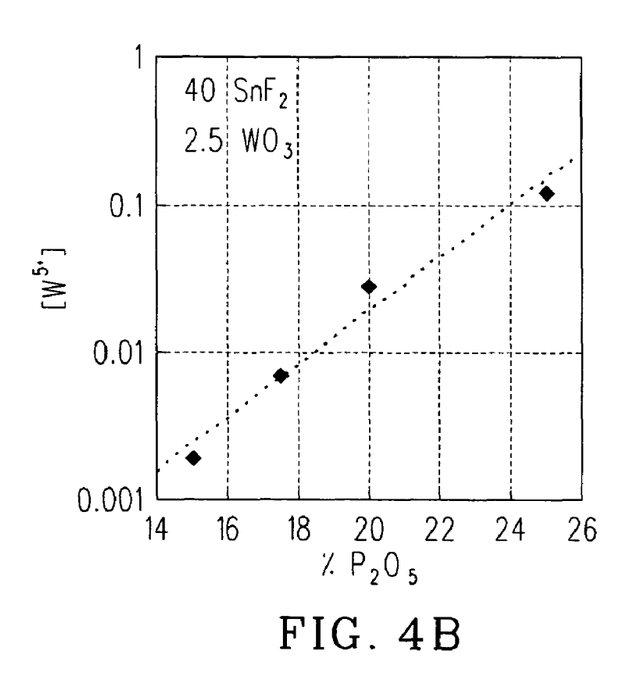

FIG. 4B is a graph that illustrates the results of another set of EPR measurements which were made using selected samples of W-doped Sn-fluorophosphate glasses 306 which had a 40% $SnF_2$ content. The molar compositions of these W-doped Sn-fluorophosphate glasses 306 are identified below in TABLE 3.

TABLE 3

| | Sample Glass | | | |
|---|---|---|---|---|
| | #17 | #13 | #8 | #11 |
| SnO | 42.5 | 40 | 37.5 | 32.5 |
| $SnF_2$ | 40 | 40 | 40 | 40 |
| $WO_3$ | 2.5 | 2.5 | 2.5 | 2.5 |
| $P_2O_5$ | 15 | 17.5 | 20 | 25 |
| % $W^{5+}$ | .002 | .007 | .029 | .125 |

Upon reviewing this graph and TABLE 3, the results indicate that, at a constant 40% $SnF_2$ concentration and fixed W doping level, the proportion of reduced W increases exponentially with increasing $P_2O_5$ content, again corresponding to a tint change from a pale brown (most oxidized) to a very dark blue (most reduced).

These results indicate that the least strongly colored W-doped Sn-fluorophosphate glasses 306 also happen to be the ones with the lowest $P_2O_5$ content within the compositional range. Plus, the least strongly colored W-doped Sn-fluorophosphate glasses 306 happen to be the ones with the highest O/F ratio and hence the ones which have the most durability. In one embodiment, the preferred O-rich W-doped Sn-fluorophosphate glasses 306 have an O/F ratio greater than 0.85 and have a composition of Sn (58-68 wt %), P (5-11 wt %), O (11-21 wt %), F (6-13 wt %) and W (1-10 wt %).

Figure 5A:
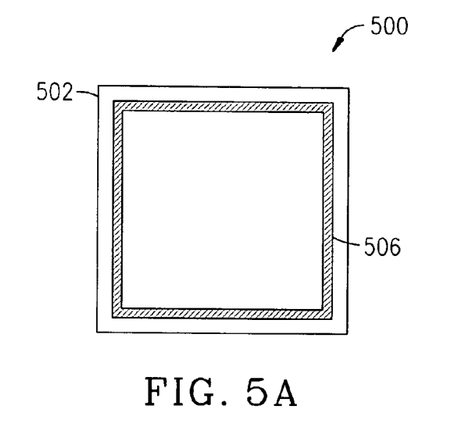
FIGS. 5A and 5B respectively show a top view and a cross-section side view of a package which can be made by using the W-doped Sn-fluorophosphate glass of the present invention.
Figure 5B:
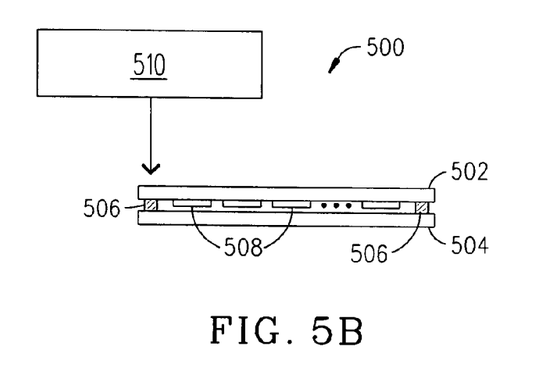

Referring to FIGS. 5A and 5B, there are shown two different views of a package 500 which can be made by using the W-doped Sn-fluorophosphate glass of the present invention. As shown, the package 500 includes a first plate 502 (e.g., glass plate 502), a second plate 504 (e.g., glass plate 504) and a frit 506 (which is made from W-doped Sn-fluorophosphate glass). The package 500 can be manufactured by taking the first plate 502 and the second plate 504 and depositing the frit 506 onto the second substrate plate 504. Then, OLEDs 508 (or other device(s) 508) are deposited on the first plate 502. Thereafter, a heating source 510 (e.g., laser 510, infrared light 510) is used to heat the frit 506 which melts and forms a hermetic seal that connects the first plate 502 to the second plate 504 and also protects the OLEDs 508 (or other device(s) 508). The relatively low glass transition temperature ($T_g$) of the frit 508 (which is made from W-doped Sn-fluorophosphate glass) means that the frit 508 can be melted to form a hermetic seal while at the same time avoiding any thermal damage to the OLEDs 508 (or other device(s) 508).

Figure 6A:
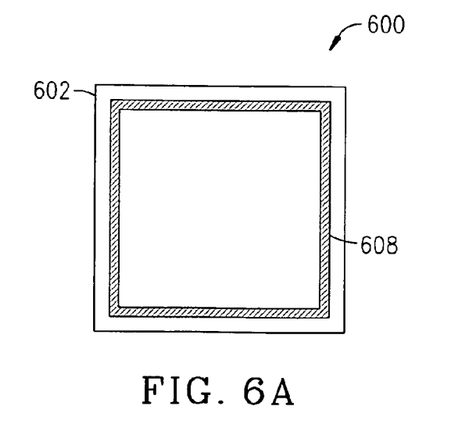
FIGS. 6A and 6B respectively show a top view and a cross-section side view of another package which can be made by using the W-doped Sn-fluorophosphate glass of the present invention.
Figure 6B:
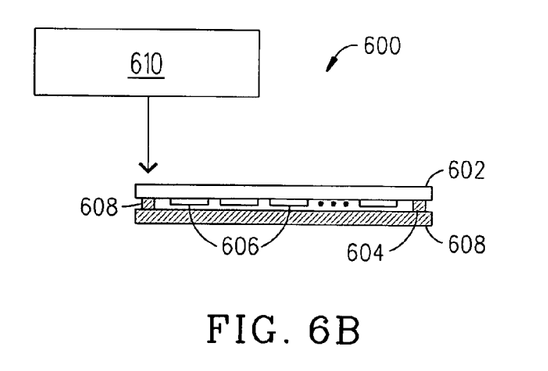

Referring to FIGS. 6A and 6B, there are shown two different views of a package 600 which can be made by using the W-doped Sn-fluorophosphate glass of the present invention. As shown, the package 600 includes a first plate 602 (e.g., glass plate 602) and a sealing second plate 604 (which is made from W-doped Sn-fluorophosphate glass). The package 600 can be manufactured by taking the first plate 602 and the sealing second plate 604 and then depositing OLEDs 606 (or other device(s) 606) on the first plate 602. Thereafter, a heating source 610 (e.g., laser 610, infrared light 610) is used to heat the sealing second plate 604 in a manner that causes a portion of it to swell and form a hermetic seal 608 that connects the first plate 602 to the sealing second plate 604 and also protects the OLEDs 606 (or other device(s) 606). The relatively low glass transition temperature ($T_g$) of the sealing second plate 604 (which is made from the W-doped Sn-fluorophosphate glass) means that a portion of it can be melted to form a hermetic seal while at the same time avoiding any thermal damage to the OLEDs 606 (or other device(s) 606).

It should be noted that the aforementioned U.S. Pat. No. 5,089,446 (Cornelius et al.) disclosed a single glass composition which contained tungsten (see element 16 in TABLE 1B of the '446 patent). This particular glass composition comprised, in weight percent on an elemental basis, 48.5% Sn, 8.0% P, 6.6% Nb, 3.3% Pb, 5.9% W, 10.5% F and 17.1% O. The resulting glass was said to have a black appearance, a glass transition temperature of 187° C. and a sealing temperature of 345° C. The inventors have performed an experiment to compare the known Nb+W-doped Sn-fluorophosphate glass (similar to element 16 in Cornelius et al.) with a solely W-doped Sn-fluorophosphate glass in accordance with the present invention.

The Nb+W-doped Sn-Fluorophosphate glass which was disclosed as element 16 in Cornelius et al. consisted of, in mol % of standard components, 23.9 SnO, 41.9 SnF$_2$, 2.58 PbF$_2$, 20.7 P$_2$O$_5$, 5.70 Nb$_2$O$_5$ and 5.18 WO$_3$. In formulating the tested Nb+W-doped glass, the PbF$_2$ was converted to an equivalent amount of SnF$_2$, and the Nb$_2$O$_5$ and WO$_3$ contents were halved so as to compare better with a WO$_3$ doping level of 2.5% and to enable a transmittance measurement (5% doping would result in very dark samples). This resulted in a Nb+W-doped glass which had the following molar composition of 30 SnO, 45 SnF$_2$, 20 P$_2$O$_5$, 2.5 Nb$_2$O$_5$ and 2.5 WO$_3$. In contrast, the tested W-doped glass of the present invention had the following molar composition of 32.5 SnO, 45 SnF$_2$, 20 P$_2$O$_5$ and 2.5 WO$_3$.

Figure 7A:
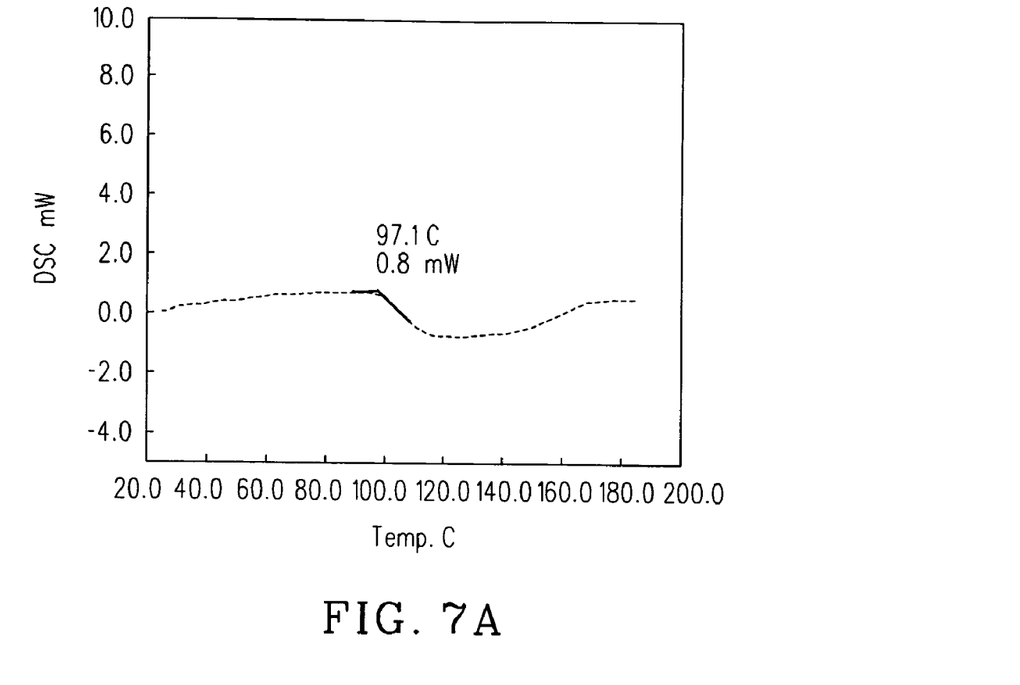
FIGS. 7A-7C show the results of an experiment conducted to compare a known Nb+W doped Sn-fluorophosphate glass to the W-doped Sn-fluorophosphate glass of the present invention.
Figure 7B:
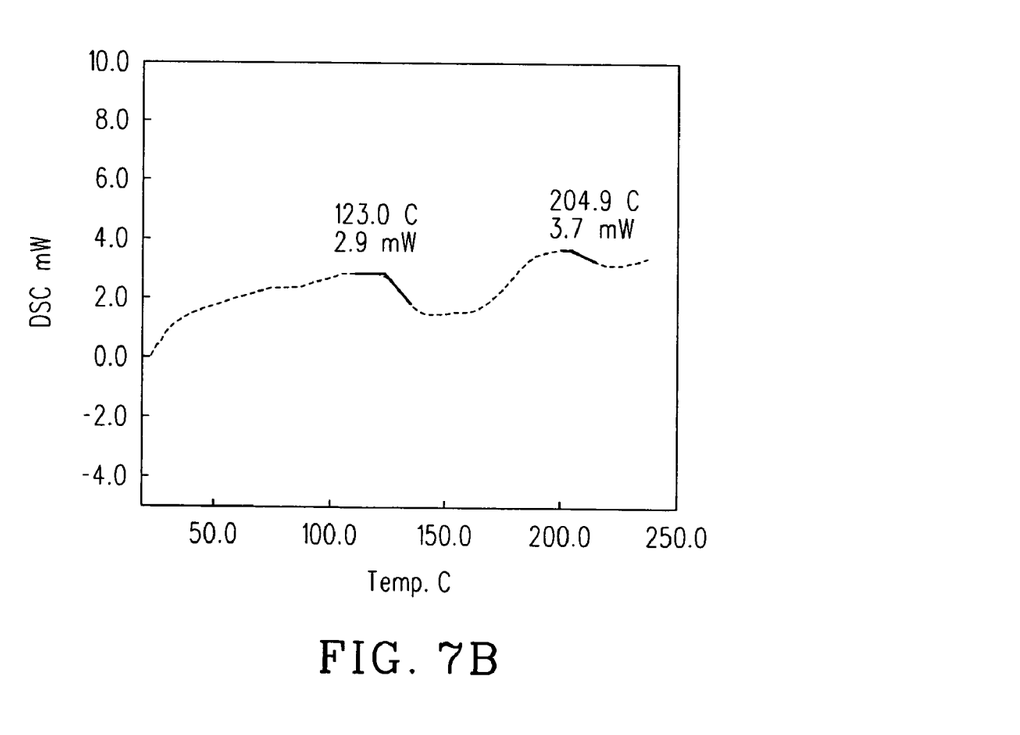

These two glass compositions were then converted back into grams of typical reagents to yield the following batches: (1) the Nb+W-doped glass included 5.95 SnO, 10.39 SnF$_2$, 6.83 NH$_4$H$_2$PO$_4$, 0.92H$_2$WO$_4$ and 0.98 Nb$_2$O$_5$; and (2) the W-doped glass included 6.57 SnO, 10.59 SnF$_2$, 6.97 NH$_4$H$_2$PO$_4$, 0.94H$_2$WO$_4$ and 0 Nb$_2$O$_5$. These two batches were individually mixed and melted in vitreous C crucibles for 20 minutes at 400° C. and then quenched by pouring them onto a steel plate. The W-doped glass was a homogeneous dark blue glass whereas the Nb+W-doped glass was an inhomogeneous blue-gray opaque material that contained numerous white inclusions which were up to 0.1 mm in size. The two samples were tested by DSC and the W-doped glass showed a single endothermic feature corresponding to the glass transition with an onset temperature of 97.1° C. as illustrated in the graph of FIG. 7A. In contrast, the scan of the Nb+W-doped glass which is illustrated in FIG. 7B shows two endothermic features corresponding to two $T_g$'s with one at 123° C. and the other at 204.9° C. indicating that the Nb+W-doped glass is not only inhomogeneous from the standpoint of the macroscopic inclusions but is also inhomogeneous on the microscopic scale.

It was believed that the Nb+W-doped glass consisted of two intermingled glasses, one with a relatively low $T_g$ of 123° C. and the other with a significantly higher $T_g$ of 205° C. This was corroborated by heating both glass samples to 200° C., holding them at that temperature for 30 minutes to reach thermal equilibrium and then attempting to indent them with a metal rod to test their relative softness or fluidity. The W-doped glass was readily indented, whereas the Nb+W-doped glass was unaffected as would be expected in view of its high second $T_g$.

Figure 7C:
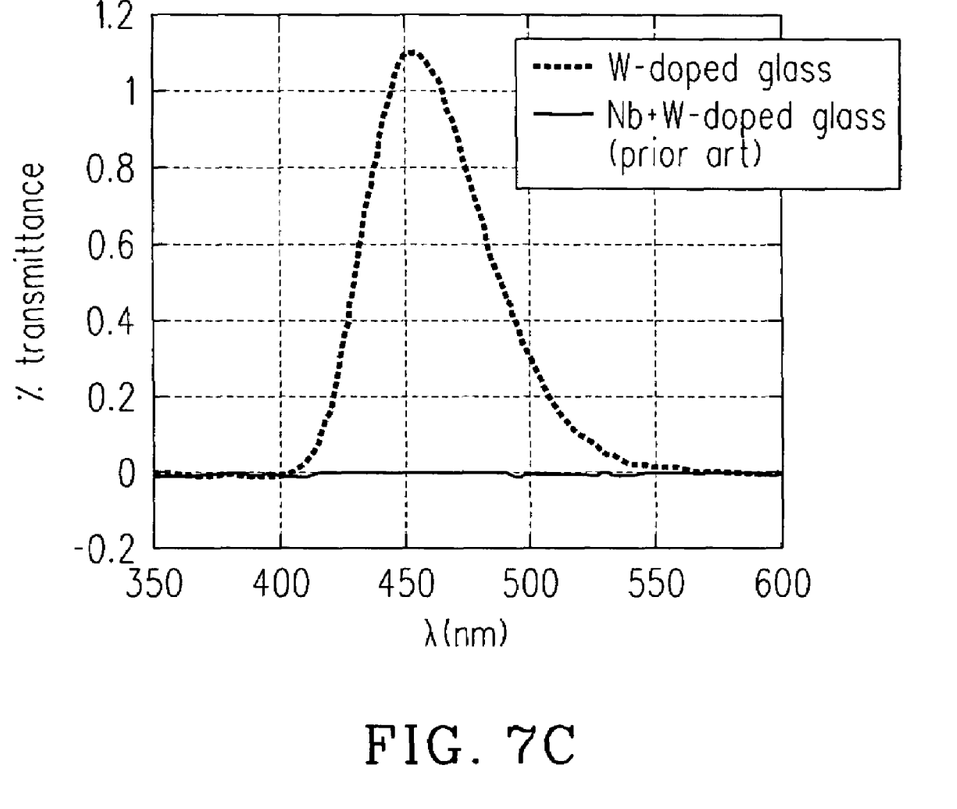

Next, the transmittance of the ~2 mm thick polished plates of both glass samples was measured. As can be seen in FIG. 7C, the Nb+W-doped glass was clearly opaque over the illustrated range whereas W-doped glass does transmit, albeit weakly due to the great thickness, giving it it's characteristic blue coloration. Neither of the glass samples transmitted at longer wavelengths in the red portion of the visible spectrum. In conclusion, this experiment indicated that the Nb+W-doped glass associated with element 16 in Cornelius et al. was not homogeneous (being at best translucent but more commonly opaque) because of the presence of Nb-containing crystals. This is because Nb is only partially soluble in these Sn fluorophosphate glasses. In contrast, the glass compositions of the present invention are homogeneous and do not suffer from this particular problem because they do not contain the partially-soluble Nb.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A homogeneous glass comprising:
   Sn (55-75 wt %)
   P (4-14 wt %)
   O (6-24 wt %)
   F (4-22 wt %)
   W (0.5-15 wt %) and having a glass transition temperature $T_g$<160° C.

2. The homogeneous glass of claim 1, wherein a source of said W is tungstic acid ($H_2WO_4$).

3. The homogeneous glass of claim 1, having a pale coloration which is suitable for sealing light emitting devices.

4. The homogeneous glass of claim 1, wherein said homogenous glass has an O/F ratio greater than 0.85 and has a preferred composition:
   Sn (58-68 wt %)
   P (5-11 wt %)
   O (11-21 wt %)
   F (6-13 wt %)
   W (1-10 wt %).

5. The homogeneous glass of claim 1, wherein said homogenous glass has an O/F ratio greater than 0.85 and has a preferred composition:
   Sn (59-68 wt %)
   P (6-11 wt %)
   O (13-20 wt %)
   F (6-11 wt %)
   W (1-6 wt %).

6. The homogeneous glass of claim 1, having a weight gain of less than 2% after exposure to air at atmospheric pressure, a temperature of 85° C., and a moisture content of 85% relative humidity, for a period of at least 1000 hours.

7. An encapsulated article, comprising:
   a device encapsulated in a homogenous glass including, in weight percent on an elemental basis, 55-75% Sn, 4-14% P, 6-24% O, 4-22% F, and 0.15-15% W, said homogenous glass having a glass transition temperature $T_g<160°$ C.

8. The encapsulated article of claim 7, wherein a source of said W is tungstic acid ($H_2WO_4$).

9. The encapsulated article of claim 7, wherein said device is a selected one of:
   an organic-electronic device including:
      an OLED;
      a PLED,
      a photovoltaic; and
      a thin film transistor;
   a thin-film sensor;
   an optoelectronic device including:
      an optical switch; and
      a waveguide;
   a photovoltaic device;
   a food container; or
   a medicine container.

10. A method for encapsulating a device, said method comprising the steps of:
   depositing a homogeneous glass over at least a portion of said device; and
   heat treating said homogeneous glass that was deposited over said at least a portion of said device, wherein said homogeneous glass has a glass transition temperature $T_g<160°$ C. and has a composition:
      Sn (55-75 wt %)
      P (4-14 wt %)
      O (6-24 wt %)
      F (4-22 wt %)
      W (0.5-15 wt %).

11. The method of claim 10, wherein a source of said W is tungstic acid ($H_2WO_4$).

12. The method of claim 10, wherein said homogenous glass has an O/F ratio greater than 0.85 and has a preferred composition:
   Sn (58-68 wt %)
   P (5-11 wt %)
   O (11-21 wt %)
   F (6-13 wt %)
   W (1-10 wt %).

13. The method of claim 10, wherein said homogenous glass has an O/F ratio greater than 0.85 and has a preferred composition:
   Sn (59-68 wt %)
   P (6-11 wt %)
   O (13-20 wt %)
   F (6-11 wt %)
   W (1-6 wt %).

14. The method of claim 10, wherein said device is a selected one of:
   an organic-electronic device including:
      an OLED;
      a PLED,
      a photovoltaic; and
      a thin film transistor;
   a thin-film sensor;
   an optoelectronic device including:
      an optical switch; and
      a waveguide;
   a photovoltaic device;
   a food container; or
   a medicine container.

15. A package comprising:
   a plate; and
   a sealing glass plate which includes a swelled portion that is a hermetic seal which connects said plate to said sealing glass plate and also creates a gap between said plate and said sealing glass plate, wherein said sealing glass plate has a glass transition temperature $T_g<160°$ C. and has a composition:
      Sn (55-75 wt %)
      P (4-14 wt %)
      O (6-24 wt %)
      F (4-22 wt %)
      W (0.5-15 wt %).

16. The package of claim 15, wherein said homogenous glass has an O/F ratio greater than 0.85 and has a preferred composition:
   Sn (58-68 wt %)
   P (5-11 wt %)
   O (11-21 wt %)
   F (6-13 wt %)
   W (1-10 wt %).

17. The package of claim 15, wherein said homogenous glass has an O/F ratio greater than 0.85 and has a preferred composition:
   Sn (59-68 wt %)
   P (6-11 wt %)
   O (13-20 wt %)
   F (6-11 wt %)
   W (1-6 wt %).

18. A package comprising:
   a first plate;
   a second plate; and
   a frit made from a homogeneous glass, wherein said frit was heated in a manner that caused said frit to melt and form a hermetic seal which connects said first plate to said second plate, wherein said homogeneous glass has a glass transition temperature $T_g<160°$ C. and has a composition:
      Sn (55-75 wt %)
      P (4-14 wt %)
      O (6-24 wt %)
      F (4-22 wt %)
      W (0.5-15 wt %).

19. The package of claim 18, wherein said homogenous glass has an O/F ratio greater than 0.85 and has a preferred composition:
Sn (58-68 wt %)
P (5-11 wt %)
O (11-21 wt %)
F (6-13 wt %)
W (1-10 wt %).

20. The package of claim 18, wherein said homogenous glass has an O/F ratio greater than 0.85 and has a preferred composition:
Sn (59-68 wt %)
P (6-11 wt %)
O (13-20 wt %)
F (6-11 wt %)
W (1-6 wt %).

* * * * *